United States Patent [19]

Risney

[11] 3,716,156

[45] Feb. 13, 1973

[54] BOAT TRANSPORTER
[76] Inventor: Donald R. Risney, 2028 Richmond St., Sacramento, Calif. 95825
[22] Filed: March 30, 1971
[21] Appl. No.: 129,335

[52] U.S. Cl. ....................214/450, 9/39, 214/146.5
[51] Int. Cl. .............................................B60r 9/00
[58] Field of Search .....214/450, 146.5; 9/31, 34, 35, 9/39; 296/23 B

[56] References Cited

UNITED STATES PATENTS

| | | | |
|---|---|---|---|
| 3,435,970 | 4/1969 | Sutton | 214/450 |
| 2,473,557 | 6/1949 | Woodruff | 9/39 |
| 2,530,840 | 11/1950 | Post | 9/39 |
| 2,753,063 | 7/1956 | Abel | 214/450 |
| 2,308,648 | 1/1943 | De Vry | 214/146.5 |
| 1,604,494 | 10/1926 | Snyder | 214/146.5 |

Primary Examiner—Gerald M. Forlenza
Assistant Examiner—John Mannix
Attorney—Alexander B. Blair

[57] ABSTRACT

A cross piece clamped and tied to the ends of a boat, rotatable about the short axis thereof, and longitudinally movable about the long axis thereof for lifting the boat onto the roof of a vehicle. A pin-tube assembly for removably and controllably positioning wheels to the rear of a boat.

4 Claims, 11 Drawing Figures

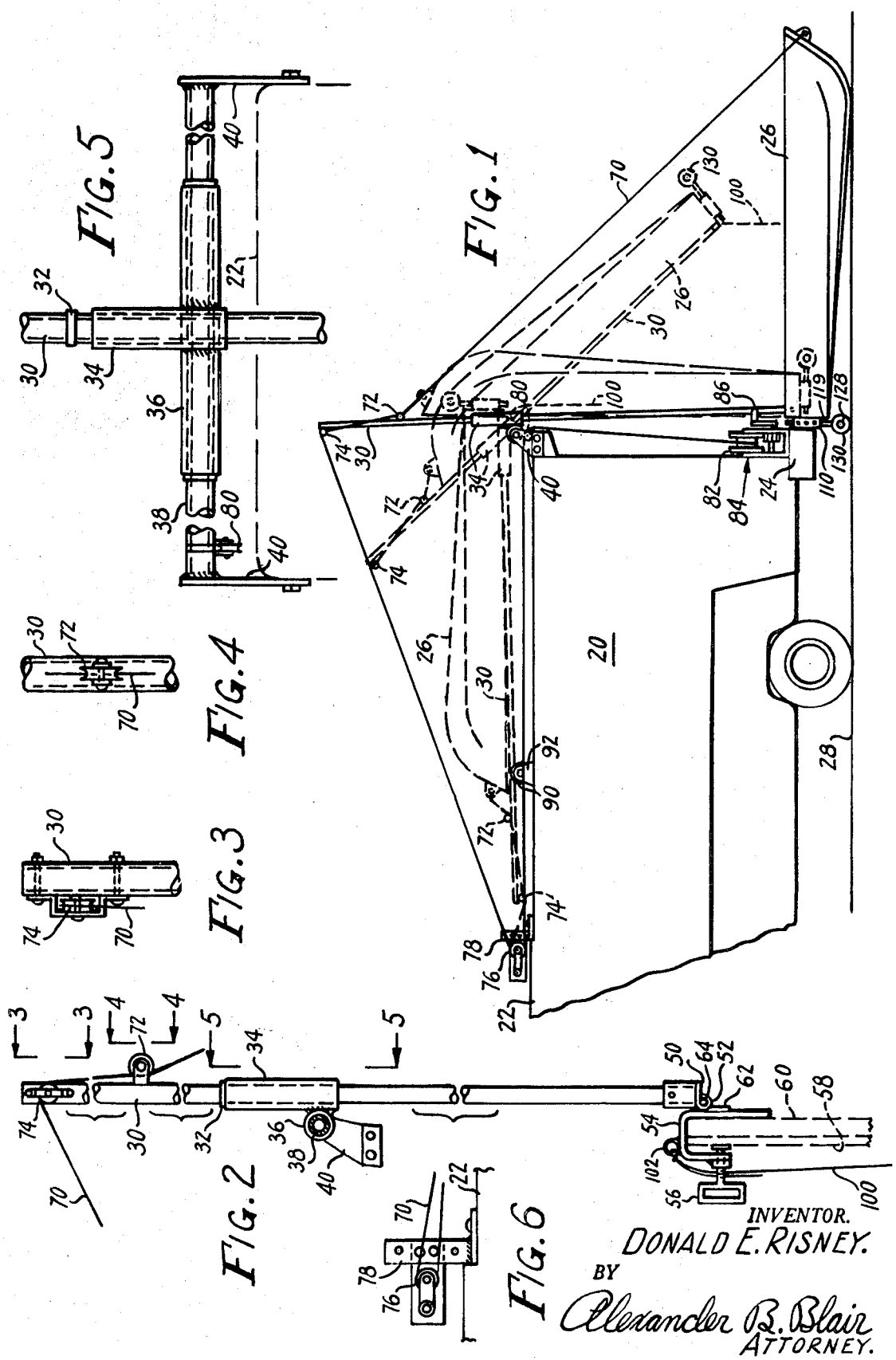

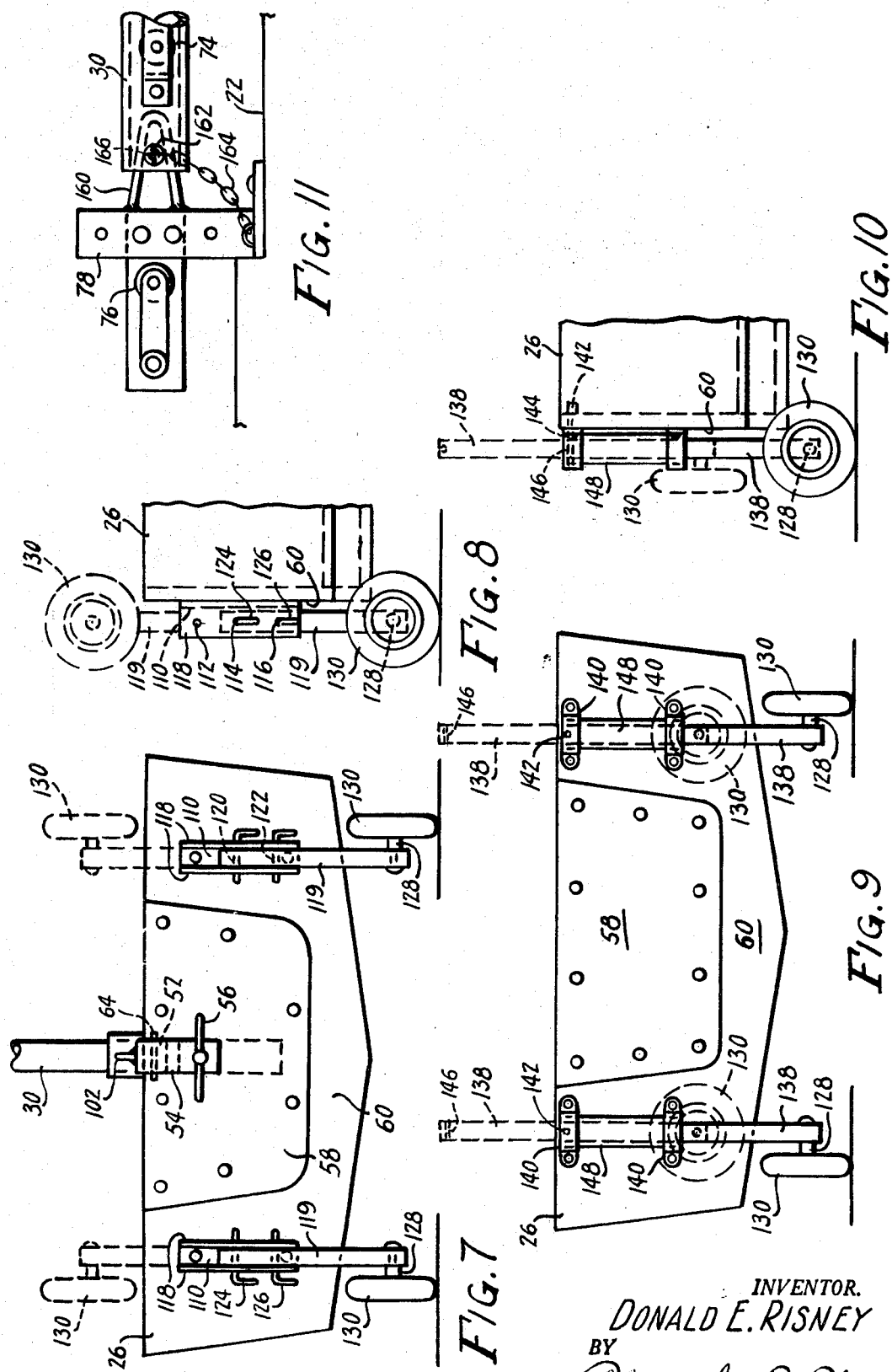

3,716,156

BOAT TRANSPORTER

This invention relates to a simple and efficient apparatus for transporting a boat.

Accordingly, a primary object of this invention is to lift a boat onto the roof of a vehicle in a simple manner minimizing the time and effort necessary.

Another object of this invention is securing the boat to the roof of the vehicle without the necessity of a person getting onto the roof of the vehicle.

A further object of this invention is the provision of means for simple and rapid positioning of wheels connected to the rear of a boat.

The above and other objects of this invention will become apparent to those skilled in the art after a detailed description of preferred embodiments of this invention taken together with the accompanying drawing wherein:

FIG. 1 is a side elevational view of the apparatus;

FIG. 2 is a blown up view of the long pole;

FIG. 3 is a sectional view taken on the line 3—3 of FIG. 2;

FIG. 4 is a sectional line taken on line 4—4 of FIG. 2;

FIG. 5 is a sectional view taken on line 5—5 of FIG. 2;

FIG. 6 is a blown up view of the pulley and locking bracket;

FIG. 7 is a front elevational view of the transom wheel and clamp assemblies;

FIG. 8 is a side elevational view thereof;

FIG. 9 is an embodiment of the transom wheel assembly;

FIG. 10 is a side elevational view thereof; and

FIG. 11 is a blown up side elevational view of the apparatus securing the pole.

Referring in detail to the drawing, there is shown a vehicle 20 having a roof 22 and a bumper 24. A boat 26 and vehicle 20 rest on ground 28.

As clearly shown in FIGS. 2 and 5, a long pole 30 with a collar stop 32 is slidably secured within a sleeve 34 which is in turn fixed to a transverse sleeve 36. Sleeve 36 is slidably mounted for rotation about the longitudinal axis thereof on a pole 38 which is fixedly supported to the rear edge of roof 22 by means of brackets 40.

As clearly shown in FIG 2, the bottom end of pole 30 has a leg 50 of a hinge 52 secured thereto. A clamp 54 with a clamp screw 56 is tightly clamped onto transom 58 and stern 60 of boat 26. Secured to clamp 54 is a leg 62 of hinge 52 either removably or fixedly secured to hinge 52 through the use of a removable or permanent hinge pin 64.

A line 70 is attached to the bow of boat 26 and is run through pulleys 72 and 74 along the top portion of pole 30. Line 70 then runs around a pulley 76 secured to a stop bracket 78 mounted on roof 22 reversing the direction of movement of line 70. Line 70 is finally run over a pulley 80 extending from pole 38 and is wound on the drum 82 of a winch 84 by means of a removable winch handle 86.

As clearly shown in FIG. 11, a looped rod 160 is welded onto bracket 78. A bolt 162 secured by a chain 164 anchored to roof 22 is insertable through a hole 166 in pole 30 for locking looped rod 160 together with pole 30 as an additional safety measure in case line 70 breaks while travelling.

In order to lift boat 26 onto roof 22 and secure boat 26 thereon, winch handle 86 is rotated winding line 70 thereon thereby lifting the bow of boat 26 upward as leg 62 of hinge 52 moves toward leg 50 until boat 26 is in an upright position against the rear of vehicle 20. Collar 32 prevents boat 26 from touching ground 28. Stern 60 is now lifted up and away from vehicle 20 manually with further turning of handle 86. During rotation of sleeve 36 as stern 60 is moved away from vehicle 20, boat 26 will move relative to pole 38 as pole 30 is slidably pulled through sleeve 34 by winch 84. As soon as the center of gravity of boat 26 is over roof 22, pole 30 makes physical contact with a roller 90 rotatably mounted on a guide mount 92. Boat 26 is pulled toward the front of the vehicle 20 as pole 30 rolls over guard 92 and is finally secured on roof 22 to the holes of locking bracket 78 and by locking winch 84 and removing handle 86 therefrom. When boat 26 is to be taken off the vehicle 20, a line 100, as shown in FIG. 2, which is tied to an eyelet 102 when clamp 54 is pulled until the center of gravity of boat 26 allows it to be tipped over the rear edge of vehicle 20 thereby rotating sleeve 36 about pole 38.

As clearly shown in FIGS. 7 and 8, stern 60 has secured near each end thereof a vertically positioned channel 110 with three sets of holes 112, 114 and 116 in the legs 118 thereof. A tube 119 having holes 120 and 122 therein is matably and removably positioned between legs 118 of each channel 110 through the use of a pivot pin 124 and a locking pin 126. Secured to the end of each tube 119 is an axle 128 and a wheel 130. Wheel 130 may be pivoted to the dotted line position merely by removing locking pin 126 from holes 116 and 122 and inserting locking pin 126 through holes 112 and 122.

The embodiment of FIGS. 9 and 10 show a pair of brackets 140 substituted for each channel 110 of FIGS. 7 and 8. Tube 138 is rotatably and slidably mounted within brackets 140 and is locked into the solid or dotted line positions by means of a spring actuated pin 142 mounted on the inside of stern 60 which is insertable through holes 144 and 146 of sleeve 148 and tube 138 rotatably and slidably mounted within sleeve 148 which is in turn secured to stern 60 by means of brackets 140.

While preferred embodiments of this invention have been illustrated and described, it should be understood by those skilled in the art that many changes and modifications may be resorted to without departing from the spirit and scope of the invention.

I claim:

1. A boat transporter comprising a vehicle having forward and rear ends and a top extending generally horizontally therebetween, a sleeve mounted on the rear end of said vehicle at the top portion thereof for pivotal movement about a transverse pivot from an upright position to a horizontal position extending longitudinally of said vehicle and at least partially overlying the top of said vehicle, a pole slidably mounted in said sleeve and having upper and lower ends with said sleeve in upright position, means hingedly and detachably connecting the lower end of said pole to the rear end of a boat to be transported, first cable guide means mounted on said pole adjacent the upper end thereof, second cable guide means mounted on said top adjacent the forward portion thereof, third cable guide means mounted on said top at the rear portion thereof, a cable winch mounted on said rear end of said vehicle below said top, a cable extending from said winch over said third cable guide means, said second cable guide means said first cable guide means and detachably secured to the forward end of the boat to be transported whereby on winding in the cable on said winch the boat is raised from its forward end to engage said pole, said pole being pivoted with said boat from a vertical position to a horizontal position and moved forwardly to engage the upper end of said pole with said second cable guide means.

2. The boat transporter of claim 1, including rollable means removably and positionably mounted to the stern of the boat upon which the boat may be pivoted in relation to the ground.

3. The boat transporter of claim 2, wherein said rollable means is pivotally mounted for rolling and pivoting the boat in relation to the ground while the boat is right-side-up and up-side-down in the alternative.

4 The boat transporter of claim 2, wherein said rollable means is rotatably mounted to the boat allowing the boat to be rolled and pivoted in relation to the ground both right-side-up and up-side-down in the alternative and allowing said rollable means to be positioned so not to extend below or above the boat.

* * * * *